May 23, 1961 N. D. NEAL 2,984,953
ELECTRICAL GAUGING DEVICE
Filed June 13, 1958 2 Sheets-Sheet 1
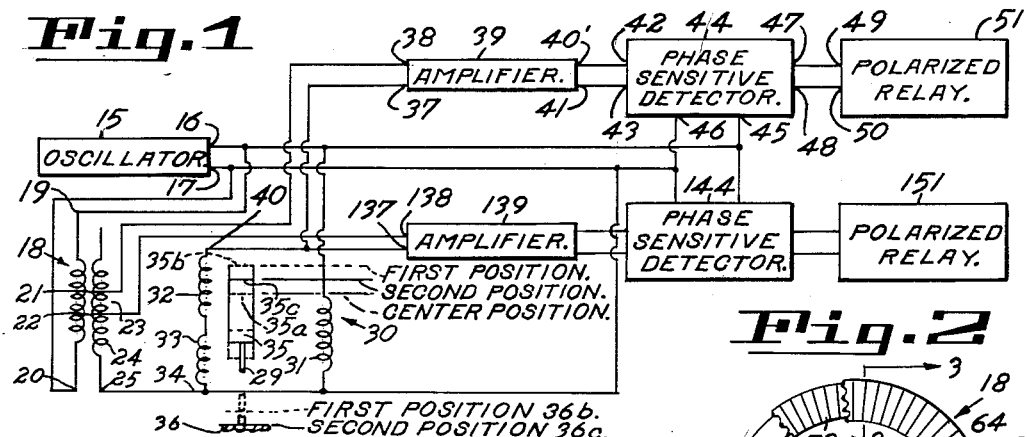
Fig. 1
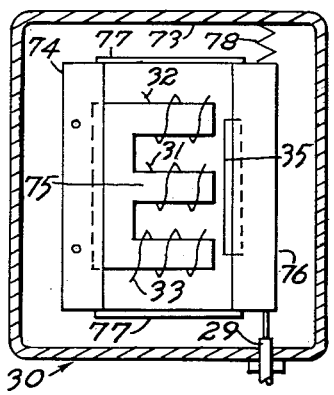
Fig. 5
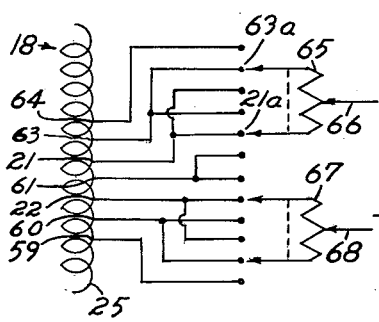
Fig. 4
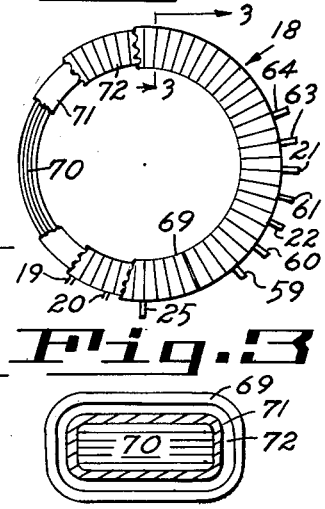
Fig. 2
Fig. 3
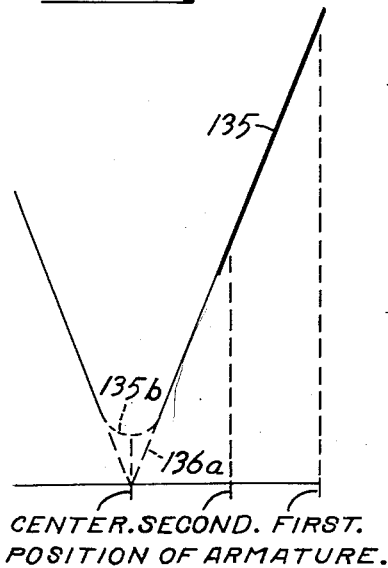
Fig. 11
CENTER. SECOND. FIRST.
POSITION OF ARMATURE.
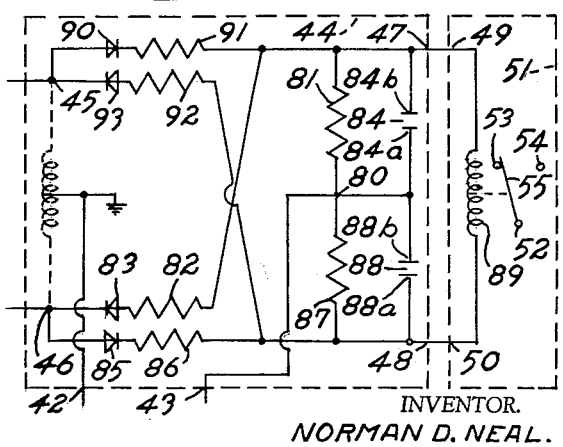
Fig. 6
INVENTOR.
NORMAN D. NEAL.
BY
*Howard J. Keiser*
*John F. Verhoven*
ATTORNEYS.

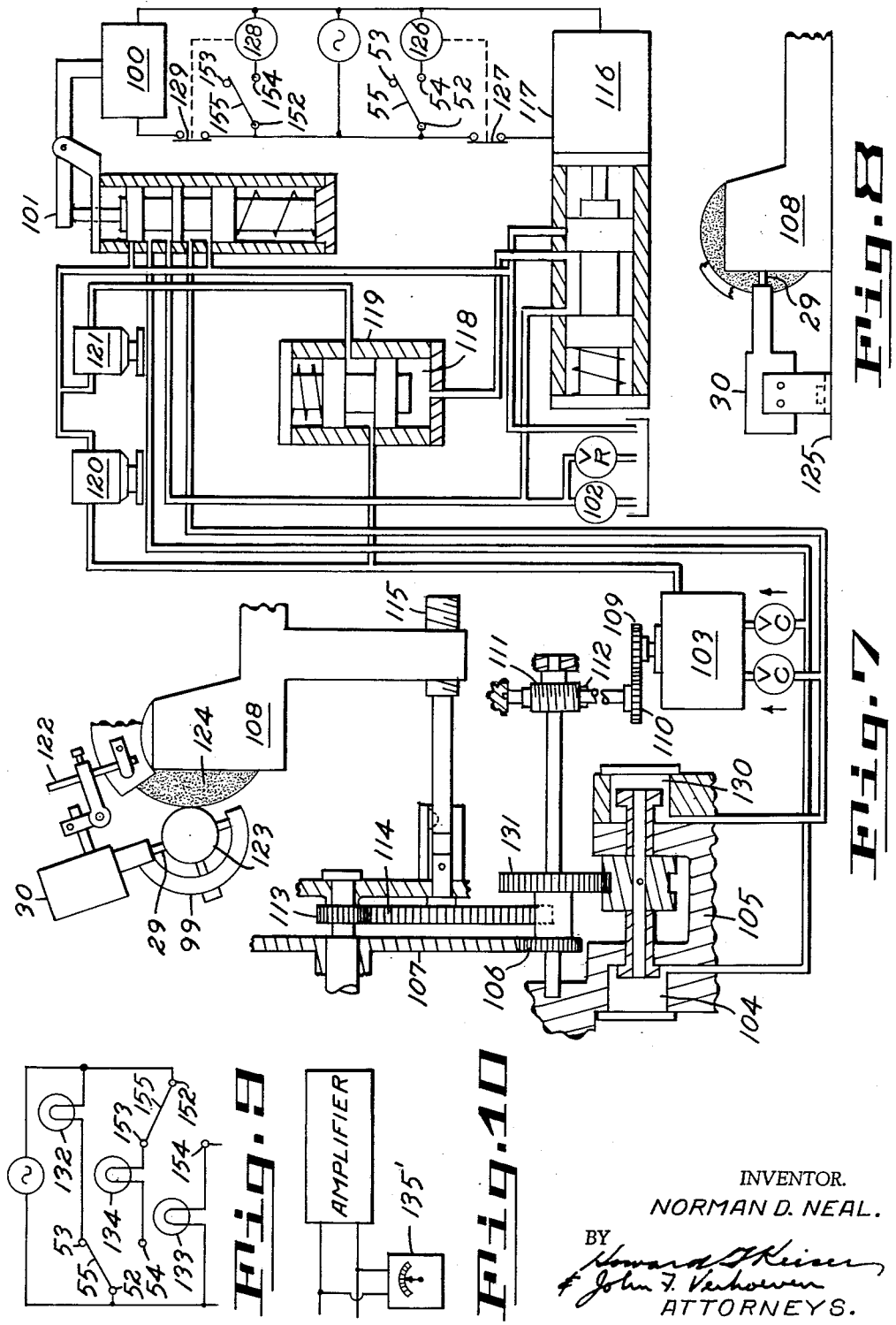

Patented May 23, 1961

2,984,953

ELECTRICAL GAUGING DEVICE

Norman D. Neal, Cincinnati, Ohio, assignor to The Cincinnati Milling Machine Co., Cincinnati, Ohio, a corporation of Ohio Filed June 13, 1958, Ser. No. 741,935

6 Claims. (Cl. 51—165)

The present invention relates to an electrical device utilizing a differential transformer particularly suitable for measuring the size of a finished workpiece, or for controlling the operation of a machine tool in response to the size of an in-process workpiece or in response to the position of a surface of the machine tool.

A device constructed in accordance with the preferred embodiment of the present invention is operable to give a plurality of signals corresponding to a plurality of sizes or positions of the workpiece or surface. Thus, when used in a machine tool the device may operate automatically to change the feed rate when the workpiece reaches one size, and to retract the cutting element when the workpiece reaches finished size. Or, when used to gauge finished workpieces, one signal will indicate the relationship between the workpiece size and the maximum allowable size, and the other signal will indicate the relationship of the workpiece to the minimum allowable size. These two signals can be utilized to operate three lights to indicate, with a single gauging, whether the workpiece is oversize, within allowable tolerance limits, or undersize.

In the preferred embodiment of the invention the differential transformer has a pair of oppositely wound, serially connected, secondary windings and a movable armature. The armature is operatively engaged with the surface to be measured, or gauged, so that it is in an off-center first position in relation to the secondary windings of the differential transformer when the surface to be gauged is in a first position, and is in a second off-center position, between the first position and the center position when the surface to be measured is in a second position. The first position of the surface may, for example, in in-process gauging, correspond to the position of the surface of the workpiece when it is desired to change from normal to slow feed or, in a gauge to measure finished workpieces, the first position may indicate the surface of a workpiece of maximum allowable size. The second position of the workpiece surface may correspond to the size of an in-process workpiece when it is desirable to reverse the feed mechanism or, in a gauge for finished workpieces, may correspond to the minimum allowable size of the workpiece.

The secondary of a tapped toroidal transformer is connected at one end to one end of the serially connected secondary windings of the differential transformer and has a first tapped portion and a second tapped portion. The voltage across the first tapped portion of the toroidal transformer is equal in value but of opposite polarity to the voltage produced across the two secondary windings when the armature is in the first position, and the voltage across the second tapped portion of the toroidal transformer is equal in value but of opposite polarity to the voltage of the secondary windings when the armature is in the second position. The first and second tapped portions of the toroidal transformer are each connected in a separate circuit with both secondaries of the differential transformer and with means to produce a signal in response to zero voltage. Thus, two circuits are defined, each containing both secondary windings, a selected voltage operable to oppose and match the voltage across the secondary windings when the armature is in a selected position, and a signal means operable in response to a zero voltage to indicate that the armature, and hence the surface to be measured, is in the selected position.

Differential transformers have been used before in gauges but in many of these applications a signal is used which is obtained when the armature is in a centered position in relation to the secondary windings, and the resultant voltage across those windings is zero. In other applications the voltage produced by the movement of the armature from a centered position to another position is used to produce a signal on the assumption that said voltage is proportional to the distance from the centered position to said other position. Indications are that the voltage produced across the secondary windings does not bear a true linear relationship to the movement of the armature around the centered position due, probably, to the inherent characteristics of the transformer. Better linear characteristics are obtained when the differential transformer is operated with the armature off-center.

In the preferred embodiment of the present invention the armature does not approach the centered position during normal operation and the voltage obtained across the secondary windings when the armature is in the first off-center position or the second off-center position are in no way related to, or measured from, the zero voltage across the secondary windings when the armature is in the centered position. In fact, the preferred embodiment of the present device can be operated successfully even though the armature thereof does not normally, in the absence of engagement with a surface, assume a centered position. Thus, no initial adjustment of the instrument to center the armature is required. Instead, all that is required is the selection of taps on the toroidal transformer to produce voltages equal in value to the voltages produced by the differential transformer when a surface is in the desired selected positions.

Other advantages accrue from the use of two simple circuits, each supplying a zero voltage across the indicating means when the surfaces to be measured are, respectively, in the first selected position and the second selected position.

Only the voltage across the secondary windings and the opposing voltage of the toroidal transformer appear in each circuit, and it is the condition of each circuit separately that triggers the circuit's indicating means. It is not necessary to compare the condition of two circuits and, consequently, calibrated parameters are not required to match parameters appearing in a compared circuit.

It is therefore a general object of the present invention to provide a device operable to produce two or more signals to indicate two or more selected positions of a surface for the control of a machine tool in response to the continually changing position of the surface of a workpiece in-process.

It is another object of the present invention to provide a gauge which will indicate simultaneously the size of a finished workpiece in relation to a selected minimum size and a selected maximum size.

It is another object of the present invention to provide a device of the differential transformer type which is operated with the armature in an off-centered position to produce a voltage across the secondary windings of the transformer.

It is a further object to produce a sensitive gauge of simple circuitry, effective in its operation, and easy to set up and operate.

Other objects and advantages of the present invention should be readily apparent by reference to the following specification, considered in conjunction with the accompanying drawings forming a part thereof, and it is to be understood that any modifications may be made in the exact structural details there shown and desrcibed, within the scope of the appended claims, without departing from or exceeding the spirit of the invention.

In the drawings:

Fig. 1 is a circuit diagram of the device of the present invention;

Fig. 2 is an elevational view of the toroidal transformer;

Fig. 3 is a view through section 3—3 of Fig. 2;

Fig. 4 is a schematic diagram of the supplementary taps for the toroidal transformer;

Fig. 5 is an elevational view, partly in cross-section, of the differential transformer;

Fig. 6 is a circuit diagram of the phase sensitive detector and polarized relay;

Fig. 7 is a schematic diagram of a center type grinding machine with the device used as a control mechanism responsive to the size of an in-process workpiece;

Fig. 8 is an elevational view of the differential transformer mounted on the bed of a grinding machine for engagement with the wheel head thereof;

Fig. 9 is a circuit diagram showing utilization of the device of the present invention as a gauge to measure finished workpieces;

Fig. 10 is a schematic diagram of a modification of the circuit of Fig. 1; and

Fig. 11 is a graph showing the range in which the differential transformer operates.

As shown in Fig. 1 the device of the present invention has an oscillator 15 which produces a constant alternating voltage across its terminals 16 and 17. The ends 19 and 20 of the primary winding of a toroidal transformer 18 are connected, respectively, to these terminals. The secondary winding of transformer 18 has a plurality of taps including taps 21 and 22, the portion of the secondary winding between tap 21 and end 25 defining a first tapped portion 23 thereof, and the portion between tap 22 and end 25 defining a second tapped portion 24.

A differential transformer 30 is energized by the oscillator 15, one end of the primary winding 31 being connected to terminal 16 and the other end being connected to terminal 17 of the oscillator. Transformer 30 has a pair of oppositely wound secondary windings 32 and 33 connected in series (i.e., connected so that the same current flows in each winding at any instant), one end 34 of which is connected to end 25 of the secondary of the tapped transformer. The differential transformer 30 has a movable armature 35 which, in a centered position 35a shown in dotted lines in Fig. 1, equally couple the secondary windings 32 and 33 with primary windings 31 to produce substantially equal voltages of opposite polarity in the secondary windings, thereby producing a resultant voltage of zero across both the secondary windings. When the armature 35 is moved to a first off-center position 35b, shown in dotted lines in Fig. 1, secondary winding 32 is coupled with primary winding 31 to a greater extent than secondary winding 33 and the voltage produced in winding 32 is thereby greater than in winding 33 and a resultant voltage is produced across the secondary windings which is a function of the position 35b of armature 35. Similarly, when the armature 35 is in a second off-center position 35c, shown in solid lines, less off-center than position 35b, a resultant voltage, smaller in magnitude, is produced across the secondary windings. The armature 35 is operatively engaged, through plunger 29, with the surface 36 for movement therewith and the position of the armature 35 is a function of the position of that surface, armature positions 35b and 35c corresponding to surface positions 36b and 36c. The surface 36 may be the surface of a workpiece or the surface of a movable member of a machine tool.

Terminals 37 and 38 of amplifier 39 are connected, respectively, to end 40 of the secondary windings and tap 21 of the toroidal transformer to define a circuit comprising the first tapped portion 23 of the toroidal transformer, the serially connected secondary windings 32 and 33 of the differential transformer, and the amplifier 39. Similarily, terminals 137 and 138 of amplifier 139 are connected, respectively, to end 40 of the secondary windings and tap 22 of the toroidal transformer to define a circuit comprising the second tapped portion 24 of the toroidal transformer, the serially connected secondary windings, and the amplifier 139.

Terminals 40' and 41 of amplifier 39 are connected, respectively, to terminals 42 and 43 of the phase sensitive detector 44, the latter having terminals 45 and 46 connected, respectively, to the terminals 16 and 17 of oscillator 15. Additional terminals 47 and 48 of the phase sensitive detector are connected, respectively, to terminals 49 and 50 of the polarized relay 51. Relay 51 has a single pole double throw switch with contact arm 55 connected to contact 52 and swingable alternately to contacts 53 and 54 (see Fig. 6). The amplifier 39, phase sensitive detector 44, and polarized relay 51 define a signaling means responsive to a zero voltage impressed across terminals 37 and 38 and operative to swing contact arm 55 from one of the contacts 53 and 54 to the other at that time. A first operating condition of the signaling means is defined when the contact arm 55 is in one position, say against contact 53; a second operating condition of the signaling means is defined when the contact arm 55 is against the other contact 54. The amplifier 139, phase detector 144, and polarized relay 151, which has a switch with arm 155 and contacts 152, 153, and 154 similar to relay 51, are similarly connected and define a signaling means responsive to a zero voltage impressed across terminals 137 and 138 and operative to swing arm 155 connected to contact 152 from one of the contacts 153 and 154 to the other when zero voltage is present across those terminals.

The tapped transformer 18, which is of the toroidal type, is shown in Figs. 2 and 3. The transformer 18 has a plurality of taps 59, 60, 22, 61, 21, 63, and 64. The tap 21, which is connected to the amplifier 39, is selected so that when the surface 36 is in a first predetermined position shown at 36b in Fig. 1, at which it is desired to produce a signal to operate switch arm 55, and the armature is therefore in the first off-center predetermined position 35b, the voltage across the first tapped portion 23 of the secondary winding of transformer 18 is equal, but of opposite polarity, to the resultant voltage produced across the secondary windings 32 and 33 of the differential transformer. As shown in Fig. 4, if the voltage desired does not correspond to one of the taps on the transformer, a potentiometer 65 having a sliding contact 66 is selectively connected through supplementary taps 63a and 21a to adjacent taps, such as 21 and 63 on the transformer 18, to establish the desired first tapped portion of the transformer between contact 66 and end 25 of the secondary of the transformer 18. Thus, when the surface 36 is moved to the first position the voltage across terminals 37 and 38 of amplifier 39 is zero and the switch 55 is operated.

The tap 22 which is connected to amplifier 139 is selected so that when the surface 36 is in a second predetermined position, shown at 36c in Fig. 1, at which it is desired to produce a signal to operate switch 155, and the armature is therefore in the second off-center predetermined position 35c, the voltage across the second tapped portion 24 of the secondary winding 18 is equal, but of opposite polarity, to the resultant voltage produced across the secondary windings 32 and 33 of the differential transformer. Potentiometer 67 with sliding contact 68 permits selection of any desired voltage across the second tapped portion of the transformer 18. Thus, when the surface 36 is moved to the second position the voltage across terminals 137 and 138 of amplifier 139 is zero and the switch 155 is operated.

A toroidal transformer having good linear characteristics and particularly suited for use in the present invention is shown in Figs. 2 and 3. The core 70 is made of a ribbon of steel of high permeability, such as Permalloy, wound into a toroid, or doughnut form and enclosed with an insulating sheath 71. An insulated wire 72 is wound over the sheath defining the primary winding of the transformer and has ends 19 and 20. A second insulated wire 69 having a terminal 25 is wound over the primary winding and has spaced taps 59, 60, 22, 61, 21, 63, and 54 to define the tapped secondary winding of the transformer 18.

As shown in Fig. 5, the differential transformer 30 has a case 73 to which a Bakelite base 74 is connected. An E shaped core 75 is embedded in the base 74 and carries secondary windings 32 and 33 on its outer poles and primary winding 31 on its center pole. A movable Bakelite member 76 is sustained in spaced relation to the core 75 by fingers 77 of spring steel connected respectively to the ends of the base 74 and member 76. The movable armature 35 is embedded in member 76 in approximate centered relation to the core 75 when in a normal position. The member 76 and armature 35 are moved to off-center positions by engagement of the movable plunger 29 slidably received through an opening in the casing. Spring 78, connected between casing 73 and member 76, returns the armature to its centered position after plunger 29 is retracted. It should be noted that accurate operation of the gauge does not depend on accurate centering of the armature 35 and means for centering adjustment need not be provided. This is because the indicating signals of the present gauge are produced when the armature is in an off-center position and neither the centered position of the armature nor the relation of the off-center position to the centered position need be used to produce an indicating signal or measure a quantity or position.

If the armature 35 is more off-center than the predetermined first position 35b and the resultant voltage across the secondary windings 32 and 33 is consequently greater than the voltage across the first tapped portion of transformer 18, a voltage will appear across terminals 37 and 38, which is amplified by amplifier 39, and impressed across terminals 42 and 43 of the phase sensitive detector 44. This voltage may, for example, be in phase with the voltage from the oscillator 15 impressed across terminals 45 and 46. The secondary winding of the oscillator output transformer is shown in dotted lines between terminals 45 and 46. As shown in Fig. 6, when point 80, connected to terminal 43, and terminal 45 are both positive current will flow from 80, through resistor 81, resistor 82, rectifier 83, to terminal 46, thereby charging capacitor 84, with end 84a positive. When 45 and 80 are negative current flows from 46 through rectifier 85, resistor 86, resistor 87 to 80, charging a capacitor 88 with side 88a positive. Thus, a D.-C. current is passed through coil 89 from terminals 50 to 49 of the polarized relay 51 to connect contacts 52 and 53 of that relay.

As the armature 35 is moved through the first predetermined position to a position less off-center than said position, the resultant voltage across the secondary windings 32 and 33 will be less than the voltage across the first tapped portion of the transformer 18 and a voltage of polarity opposite to that produced when the armature was more off-center than the first position is impressed across terminals 37 and 38. Thus, the voltage at terminals 42 and 43 will be 180° out of phase with the voltage across terminals 45 and 46. When 45 is positive and 80 negative current will flow through rectifier 90, resistor 91, resistor 81 to 80, charging capacitor 84 with side 84b positive. When 80 is positive and 45 negative current flows from 80 through resistor 87, resistor 92, rectifier 93, to 45 charging capacitor 88 with side 88b positive. Thus, a D.-C. current passes through coil 89 from terminal 49 to 50, connecting contacts 52 and 54. Arm 55 is thereby swung from contact 53 to 54 as the voltage impressed across terminals 37 and 38 swings through zero.

Detector 144 and relay 151 operate similarly in response to the voltage at terminals 137 and 138, which is the combined voltage across the secondary windings of transformer 30 and the opposing voltage of the second tapped portion 24 of the transformer 18, and the voltage at 137 and 138 will swing through zero when the armature 35 is at the second predetermined position 35c.

As shown in Figs. 7 and 8, the device of the present invention may be used as a control mechanism for a machine tool, operating in response to a first position of a surface of a workpiece in process or of a surface of a movable member, to change from normal feed to slow feed, and in response to a second position, to retract the feed mechanism. During normal feed of the machine, which is shown and described in more detail in United States Letters Patent 2,641,876, issued June 16, 1953, solenoid 100 is energized, holding valve 101 in the position shown. Pressure is supplied from pump 102 through that valve to undirectional motor 103 and chamber 104 of shifter valve 105. Thus gear 106 is held in engagement with gear 107, and the wheel head is advanced by the motor through gears 109, 110, worm 111, worm gear 112, gear 106, 107, 113, 114 and lead screw 115. At this time solenoid 116 is energized, holding valve 117 in the position shown. Pressure is therefore supplied through valve 117 to chamber 118 of valve 119, holding that valve in the position shown. Discharge from motor 103 occurs through rate valve 120, and, by way of valve 119, through rate valve 121. The differential transformer 30 is mounted on the wheel head guard by pivot arm 122 and has a gauge head 99 which, together with the plunger 29, engages the surface of a workpiece 123 held between centers (not shown) for grinding by wheel 124, as shown in Fig. 7. Alternately, the gauge may be mounted on the bed 125 of the machine and the plunger engaged by a movable member of the machine, such as the wheel head 108, as shown in Fig. 8.

When the surface of the workpiece in-process, or of the movable member, reaches a first predetermined position, contact arm 55 is operated to connect contacts 52 and 54 thereby energizing relay 126 and opening normally closed contact 127 to deenergize solenoid 116 and operate valve 117. Pressure is thereby cut off to chamber 118, the valve 119 is operated, and the discharge path from motor 103 to rate valve 121 is blocked, limiting the discharge from motor 103 to that occurring through valve 120 and slowing the motor to slow the feed rate of wheel head 108.

When the surface reaches a second predetermined position arm 155 is operated to connect contacts 152 and 154, energizing relay 128 to open normally closed contact 129, and thereby deenergize solenoid 100. This operates valve 101 so that pressure is supplied through that valve to chamber 130, instead of 104, of valve 105, pressure still being supplied to motor 103. Gear 106 is thereby disengaged from gear 107 and gear 131 engaged with gear 114, to rotate lead screw 115 in the opposite direction and retract the wheel head.

The gauge of the present invention may be used to measure finished workpieces, indicating with a single gauging whether the workpiece is oversize, within limits, or undersize. As shown in Fig. 9, a circuit including contacts 52 and 53 has an indicating lamp 132 and when the surface of the piece measured holds the armature more off-center than the first predetermined position, arm 55 will connect the contacts and light the lamp to indicate the piece is oversize. A circuit containing contacts 152 and 154 contains lamp 133 and when the surface holds the armature less off-center than the second predetermined position, arm 155 will connect contacts 152 and 154 to light the lamp and indicate the piece is undersize. A circuit containing contacts 52 and 54 and, in series therewith, contacts 152 and 153, has a lamp 134. When the workpiece holds the armature less off-center than the first predetermined position contacts 52 and 54 will be connected; when the workpiece holds the armature more off-center than the second predetermined position the contacts 152 and 153 will be connected. When both pairs of contacts are closed, the lamp 134 will light and indicate the workpiece is within limits.

As shown in Fig. 10, in any of the applications, a calibrated voltmeter 135' may be connected across terminals 37 and 38 of amplifier 39, or across terminals 137 and 138 of amplifier 139, or both, to indicate the distance of the surface from the predetermined position, or positions.

Although only two signaling means have been shown, connected, respectively, to taps 21 and 22, any number of signaling means similar to amplifier 39, phase detector 44, and polarized relay 51 can be connected to other taps on the secondary winding of toroidal transformer 18, each producing a signal when the surface of the workpiece is at one of a plurality of selected positions.

In using the device of the present invention as a control mechanism for a machine tool, a master workpiece of a size corresponding to the size at which it is desired to change from normal to slow feed, is inserted in the gauge head 99. This positions the armature at the first predetermined position 35b and produces a corresponding resultant voltage across the secondaries of the differential transformer 30. The first tapped portion 23 of the transformer 18 is then selected, equaling in value but opposing in polarity the differential transformer secondary resultant voltage, to produce a zero voltage at amplifier 39. Similarly, a master corresponding in size to a finished workpiece is inserted in the gauge head to position the armature at the second predetermined position 35c and a second tapped portion 24 of the transformer 18 is selected to produce a zero voltage at amplifier 139.

When a workpiece 123 is inserted in the machine for grinding and the gauge head 99 is engaged therewith, the workpiece will be larger than the first master, the armature will be more off-center than the first predetermined position, and the resultant voltage across the secondary windings of transformer 30 will be greater than the voltage across the first tapped portion of the transformer 18, producing a voltage at amplifier 39. Thus, one of the contacts of the polarized relay 51, say 53, will be connected to contact 52. It will be noted at this time that the voltage across the secondary windings of the differential transformer 30 will also be greater than the opposing voltage across the second tapped portion of the transformer 18, producing a voltage at amplifier 139 and connecting contact 153 with contact 152 in the polarized relay 151. As the workpiece diminishes in size, the voltages at amplifier 39 and 139 diminish, the voltage at amplifier 39 reaching zero when the part reaches the size at which slow feed is required. As the voltage at amplifier 39 passes through zero and changes polarity, contact arm 55 is swung to contact 54, reducing the feed rate of the machine. When the part reaches finished size the voltage at amplifier 139 passes through zero, and contact arm 155 is swung to contact 154, reversing the wheel head of the machine.

When the device is used as a gauge to measure finished workpieces the first and second tapped portions of the transformer 18 are selected, respectively, by inserting masters in the gauge head corresponding to the maximum allowable size and the minimum allowable size. When an oversize piece is inserted for measurement, the armature is more off-center than the first and second predetermined positions, the voltage across the secondary winding of transformer 30 is greater than the voltage of either the first of second tapped portion of the transformer 18, and contacts 53 and 153 are connected respectively to contacts 52 and 152, lighting the oversize indicating light 132. If the workpiece is less than maximum allowable size and greater than minimum size, the armature will be positioned between the first and second predetermined positions and the resultant voltage across the secondaries of transformer 30 will be less than the voltage across the first tapped portion and greater than the voltage across the second tapped portion of the transformer 18. Hence the polarity of the voltage at amplifier 39 will be opposite that which was present with an oversize piece while the voltage at amplifier 139 will be of the same polarity, although less than with an oversize piece. Therefore contacts 52 and 54 will be connected and contacts 152 and 153 will remain connected, lighting the light 134 indicating the workpiece is within tolerance limits. When the piece is undersize, the armature will be less off-center than the second predetermined position and the voltage of both tapped portions of the transformer 18 will exceed the resultant voltage of the secondary windings of differential transformer 30. Hence, the voltage at both amplifiers will be of opposite polarity to that which was present with an oversize piece, and contacts 52 and 152 will be connected, respectively, to contacts 54 and 154, lighting the undersize indicating light 133.

It will be noted that in use the armature is operated about the first and second off-center positions, as shown in Fig. 11, and resultant voltages of the differential transformer, which are utilized in obtaining the desired signals, are in a range, indicated by the heavy line 135, where good linear characteristics obtain and away from the null range, indicated by dotted lines 136a, where linear response is not certain. It should also be noted the quantity, or surface, is not measured by a voltage compared to the voltage when the armature is in a center position. Thus it is not necessary to adjust the armature to a centered position nor is it necessary that in the particular differential transformer used that there be a precise linear relation between the position of the armature and the resultant voltage across the secondaries around the centered position. If, in fact, the voltage across the secondary windings is as indicated by line 135b at the center position in the differential transformer used, the accuracy of the device will not be affected.

What is claimed is:

1. A device to indicate the position of a surface in relation to a first predetermined position and a second predetermined position comprising a differential transformer having a movable member and a pair of oppositely wound serially connected secondary windings operable to produce a null voltage across said windings when the movable member is in a center position, means to position said member in response to the position of the surface and to position said member in a first predetermined off-center position when the surface is in its first predetermined position and to position said member in a second predetermined off-center position when the surface is in its second predetermined position, a transformer having a first tapped portion operable to produce a voltage equal in value but opposite in polarity to the resultant voltage produced across the secondary windings of the differential transformer when the movable member is in its first predetermined position, and having a second tapped portion operable to produce a voltage equal in value but opposite in polarity to the resultant voltage produced across the secondary windings of the differential transformer when the movable member is in its second predetermined position, said first tapped portion and said second tapped portion of the transformer each connected in circuit with the secondary windings of the differential transformer, means connected in circuit with the first tapped portion of the transformer and the secondary windings operable in response to a zero value of the combined voltages to produce a first signal, and means connected in circuit with the second tapped portion of the transformer and the secondary windings operable in response to a zero value of the combined voltages to produce a second signal.

2. A device to indicate the position of a surface in relation to a first predetermined position and a second predetermined position comprising a differential transformer having a movable armature and a pair of oppositely wound serially connected secondary windings operable to produce a resultant voltage across said windings when the movable armature is off-center in relation to said windings, a plunger to position said armature in response to the position of the surface and to position said armature in a first predetermined off-center position when the surface is in its first predetermined position and to position said armature in a second predetermined off-center position when the surface is in its second predetermined position, a toroidal transformer having a plurality of taps and a pair of potentiometers each connected across selected pairs of adjacent taps, the toroidal transformer between one end thereof and one of said potentiometers defining a first tapped portion operable to produce a voltage equal in value but opposite in polarity to the resultant voltage produced across the secondary windings of the differential transformer when the armature is in its first predetermined position, the toroidal transformer between said one end and the second potentiometer defining a second tapped portion operable to produce a voltage equal in value but opposite in polarity to the resultant voltage produced across the secondary windings of the differential transformer when the armature is in its second predetermined position, said one end of the toroidal transformer connected to one end of the secondary windings of the differential transformer, a phase sensitive device connected in circuit with the first tapped portion of the toroidal transformer and the secondary windings operable in response to a zero value of the combined voltages to produce a first signal, a second phase sensitive device connected in circuit with the second tapped portion of the toroidal transformer and the secondary windings operable in response to a zero value of the combined voltages to produce a second signal, and means in at least one of said circuits to indicate the value of the combined voltages and thereby indicate the distance of the surface from one of said predetermined positions.

3. A control mechanism for a machine tool having means to support a workpiece and a cutting element movable in relation to the workpiece comprising a differential transformer having a movable armature and a pair of oppositely wound serially connected secondary windings operable to produce a resultant voltage across said windings when the movable armature is off-center in relation to said windings, means operatively engaging said armature with the workpiece to move the armature as the size of the workpiece diminishes during the cutting operation, said armature assuming a first predetermined off-center position when the workpiece is at a first predetermined size and assuming a second predetermined off-center position when the workpiece is at a second predetermined size, a transformer having a first tapped portion operable to produce a voltage equal in value but opposite in polarity to the resultant voltage produced across the secondary windings of the differential transformer when the armature is in its first predetermined position, and having a second tapped portion operable to produce a voltage equal in value but opposite in polarity to the resultant voltage produced across the secondary windings of the differential transformer when the armature is in its second predetermined position, said first tapped portion and said second tapped portion of the transformer connected in circuit with the secondary windings of the differential transformer, a phase sensitive relay connected in circuit with the first tapped portion of the transformer and the secondary windings operable in response to a zero value of the combined voltages to change the motion of the cutting element in relation to the workpiece, and a second phase sensitive relay connected in circuit with the second tapped portion of the transformer and the secondary windings operable in response to a zero value of the combined voltages to change the motion of the cutting element in relation to the workpiece.

4. A control mechanism for a machine tool having a movable surface comprising a differential transformer having a movable armature and a pair of oppositely wound serially connected secondary windings operable to produce a resultant voltage across said windings when the movable armature is off-center in relation to said windings, means operatively engaging said armature with the movable surface to move the armature as said surface moves, said armature assuming a first predetermined off-center position when the surface is at a first predetermined position and assuming a second predetermined position, a transformer having a first tapped portion operable to produce a voltage equal in value but opposite in polarity to the resultant voltage produced across the secondary windings of the differential transformer when the armature is in its first predetermined position, and having a second tapped portion operable to produce a voltage equal in value but opposite in polarity to the resultant voltage produced across the secondary windings of the differential transformer when the armature is in its second predetermined position, said first tapped portion and said second tapped portion of the transformer connected in circuit with the secondary windings of the differerential transformer, a phase sensitive relay connected in circuit with the first tapped portion of the transformer and the secondary windings operable in response to a zero value of the combined voltages to change the motion of the movable member of the machine, and a second phase sensitive relay connected in circuit with the second tapped portion of the transformer and the secondary windings operable in response to a zero value of the combined voltages to change the motion of the movable member of the machine.

5. A gauge for indicating the size of a finished workpiece in relation to a maximum size and a minimum size comprising a differential transformer having a movable armature and a pair of oppositely wound serially connected secondary windings operable to produce a resultant voltage across said windings when the movable armature is off-center in relation to said windings, means operatively engaging said armature with the finished workpiece to position said armature in relation to the surface of the workpiece, said armature assuming a first predetermined off-center position when the workpiece is of maximum size, and assuming a second predetermined off-center position when the workpiece is at a minimum size, a transformer having a first tapped portion operable to produce a voltage equal in value but opposite in polarity to the resultant voltage produced across the secondary windings of the differential transformer when the armature is in its first predetermined position, and having a second tapped portion operable to produce a voltage equal in value but opposite in polarity to the resultant voltage produced across the secondary windings of the differential transformer when the armature is in its second predetermined position, said first tapped portion and said second tapped portion of the transformer connected in circuit with the secondary windings of the differential transformer, means to indicate the polarity of the combined voltage of the first tapped portion of the transformer and the secondary windings, means to indicate the polarity of the combined voltage of the second tapped portion of the transformer and the secondary windings, means to indicate a workpiece is oversize when both of said combined voltages are of one polarity, means to indicate a workpiece is undersize when both of said combined voltages are of the opposite polarity, and means to indicate the size of the workpiece is between the maximum and minimum size when one of said combined voltages is of one polarity and the other of said combined voltages is of opposite polarity.

6. A circuit comprising a differential transformer having a pair of secondary windings and a movable armature positionable relative to said windings in accordance with a quantity to be measured, said armature assuming a plurality of different predetermined positions on one side of a centered position when the measured quantity equals a plurality of different predetermined quantities respectively, the secondary windings being oppositely wound and operable to produce a resultant zero voltage when the movable armature is in the centered position and operable to produce a voltage of varying magnitude and predetermined polarity as the armature is moved in one direction through said predetermined positions from said centered position, a plurality of signaling means including phase sensitive detectors, each signaling means having two operating conditions and each operable to assume one operating condition as a voltage of one polarity is impressed thereacross and to assume the other operating condition when a voltage of opposite polarity is impressed thereacross, the signaling means shiftable from one operating condition to the other as the voltage impressed across the signaling means passes through zero, the plurality of signaling means all connected in parallel across said pair of secondary windings to define a plurality of circuits all of which simultaneously include said pair of secondary windings, a plurality of constant voltage sources each connected in one of said circuits in series with the signaling means thereof and the pair of secondary windings, all of the constant voltages of said sources being of different magnitude and each being equal in value but opposite in polarity to the resultant voltage produced by the secondary windings when the armature is in one of said predetermined positions whereby different voltages are simultaneously impressed across said respective signaling means, and each signaling means is controlled in accordance with the relation of the measured quantity to one of said predetermined quantities.

References Cited in the file of this patent

UNITED STATES PATENTS

| | | |
|---|---|---|
| 2,503,851 | Snow | Apr. 11, 1950 |
| 2,508,370 | Bozoian | May 23, 1950 |
| 2,509,986 | Neff | May 30, 1950 |
| 2,627,119 | Graham | Feb. 3, 1953 |
| 2,641,876 | Decker et al. | June 16, 1953 |
| 2,745,221 | Comstock | May 15, 1956 |
| 2,827,787 | Kroeger | Mar. 25, 1958 |

UNITED STATES PATENT OFFICE

CERTIFICATION OF CORRECTION

Patent No. 2,984,953                                        May 23, 1961

Norman D. Neal

It is hereby certified that error appears in the above numbered patent requiring correction and that the said Letters Patent should read as corrected below.

Column 10, line 17, after "predetermined" insert -- off-center position when the surface is at a second predetermined --.

Signed and sealed this 15th day of August 1961.

(SEAL)
Attest:
ERNEST W. SWIDER                                            DAVID L. LADD Attesting Officer                                         Commissioner of Patents